US012739597B2

(12) United States Patent
Patenaude et al.

(10) Patent No.: US 12,739,597 B2
(45) Date of Patent: Sep. 15, 2026

(54) SYSTEM TO DETECT VEHICLE TRACKING DEVICE

(71) Applicant: GM GLOBAL TECHNOLOGY OPERATIONS LLC, Detroit, MI (US)

(72) Inventors: Russell A. Patenaude, Macomb Township, MI (US); Eric T. Hosey, Rochester Hills, MI (US); Benjamin Tran, Royal Oak, MI (US); Matthew E. Gilbert-Eyres, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 499 days.

(21) Appl. No.: 18/328,825

(22) Filed: Jun. 5, 2023

(65) Prior Publication Data

US 2024/0406681 A1 Dec. 5, 2024

(51) Int. Cl.
*H04W 4/029* (2018.01)
*H04W 4/90* (2018.01)

(52) U.S. Cl.
CPC .............. *H04W 4/029* (2018.02); *H04W 4/90* (2018.02)

(58) Field of Classification Search
None
See application file for complete search history.

(56) References Cited

U.S. PATENT DOCUMENTS 5,515,043 A * 5/1996 Berard ................... H04M 11/04 340/426.2
6,509,868 B2 * 1/2003 Flick ..................... B60R 25/104 342/357.395
6,737,989 B2 * 5/2004 Flick ..................... B60R 25/102 340/426.2
9,639,899 B1 * 5/2017 Gersitz ................... H04W 4/02
2002/0070874 A1 * 6/2002 Williams ........... G08B 13/1427 340/8.1
2006/0158328 A1 * 7/2006 Culpepper ......... G08B 21/0269 340/572.1
2016/0335878 A1 * 11/2016 Steven ................... G08B 21/24
2019/0147311 A1 * 5/2019 Purba .............. G06K 19/07713 340/572.1

FOREIGN PATENT DOCUMENTS

CN 203020268 U 6/2013

* cited by examiner

*Primary Examiner* — Adolf Dsouza
(74) *Attorney, Agent, or Firm* — Quinn IP Law

(57) ABSTRACT

Methods of detecting that a vehicle tracking device is tracking humans includes determining whether the vehicle tracking device has been removed from its linked vehicle; determining whether the vehicle tracking device is being used to track a human; and alerting when determined that the vehicle tracking device is tracking humans. Methods may determine if a weighted score is greater than a threshold and alerting: an owner of the vehicle tracking device; setting off an audio alert on the vehicle tracking device; or notifying authorities. Methods may detect human movement by detecting steep elevation changes; detecting acceleration data consistent human movement; or detecting movement that is not a road. Methods may determine if the vehicle tracking device is with a different vehicle or building by: detecting the different vehicle's hotspot; detecting the building's Wi-Fi; or detecting GPS movement that matches the different vehicle's GPS movement.

20 Claims, 3 Drawing Sheets

SYSTEM TO DETECT VEHICLE TRACKING DEVICE

INTRODUCTION

The present disclosure relates to systems and methods for determining whether a vehicle tracking device is being used to track humans. This disclosure provides a method and/or algorithm to help determine if the vehicle tracking device is being used to track an unsuspecting person rather than an intended asset. Currently no technologies exist to help determine whether a vehicle tracking device is being used to track one or more humans.

SUMMARY

A method of detecting that a vehicle tracking device is being used to track humans with a controller or non-transitory computer-readable storage medium on which is recorded instructions includes determining whether the vehicle tracking device has been removed from its linked vehicle; determining whether the vehicle tracking device is being used to track a human; and alerting when it is determined that the vehicle tracking device is tracking one or more humans.

The method may include determining whether a weighted score is greater than a threshold level. The method may include alerting at least one of: notifying an owner of the vehicle tracking device; setting off an audio alert on the vehicle tracking device; or notifying one or more authorities.

The method may include determining whether the vehicle tracking device is being used to track a human includes, detecting human movement, at least one of: detecting steep elevation changes; detecting acceleration data consistent human movement; or detecting movement that is not on any road according to map data.

The method may include determining whether the vehicle tracking device is with a different vehicle or in a building, by: detecting the different vehicle's hotspot; detecting the building's Wi-Fi; or detecting GPS movement that matches the different vehicle's GPS movement. The method may include that the vehicle tracking device includes battery power and wireless communications.

The method may include determining that the vehicle tracking device is on public transport by, at least one of: detecting GPS movement matching bus routes or stops; detecting multiple connected devices; or detecting GPS movement matching known rideshare GPS movement. The alerts may be automatically sent from a centralized location.

The above features and advantages and other features and advantages of the present disclosure are readily apparent from the following detailed description of the best modes for carrying out the disclosure when taken in connection with the accompanying drawings.

DETAILED DESCRIPTION

Figure 1:
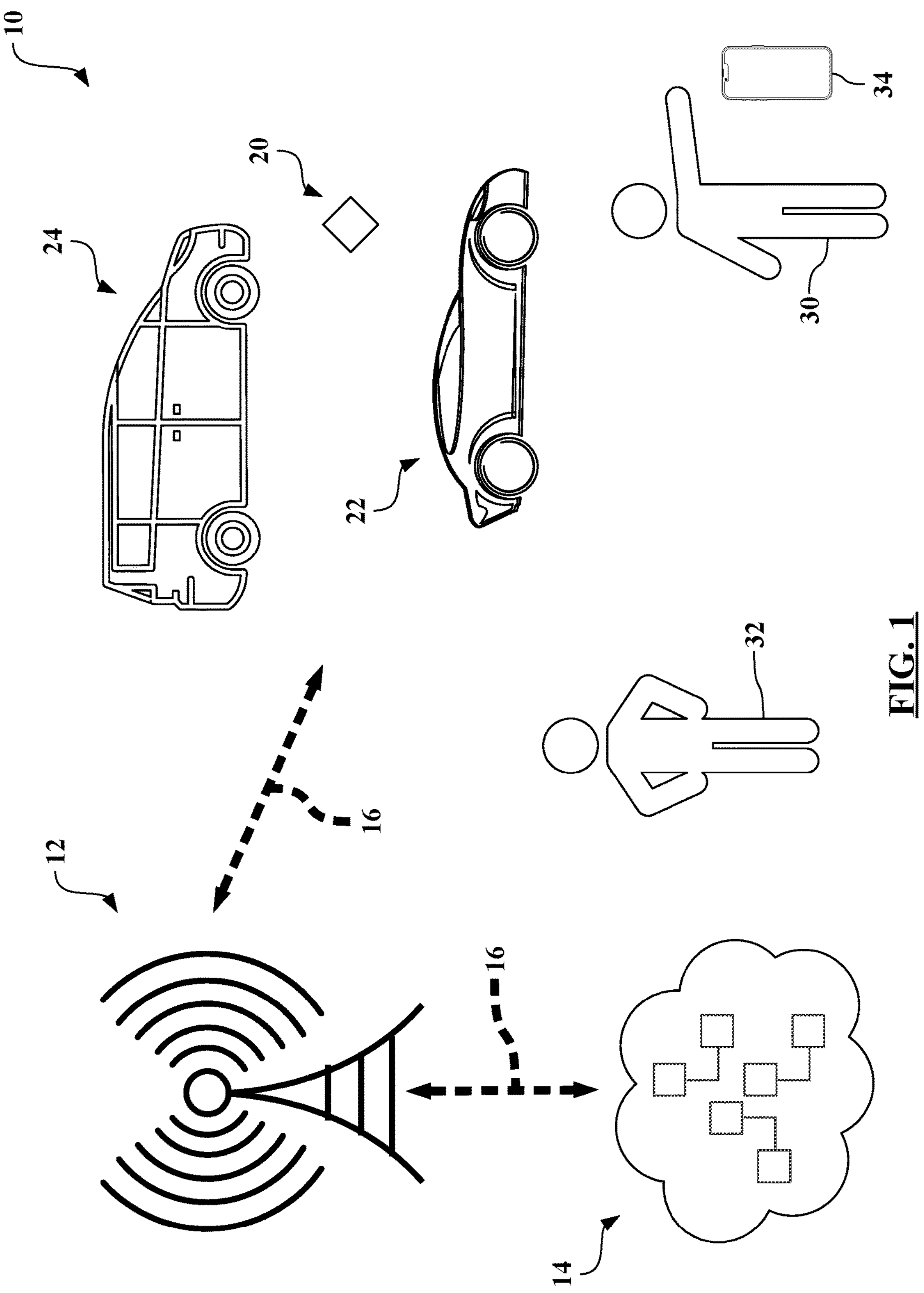
FIG. 1 is a schematic diagram of a connectivity system for detecting the possibility a tracker is being used to track humans.

Referring to the drawings, like reference numbers refer to similar components, wherever possible. FIG. 1 schematically illustrates a connectivity network or connectivity system 10. The connectivity system 10 includes numerous components, only some of which are listed herein. A remote or cellular communications system, or cellular network 12, which may be representative of many types of communications protocols, including, without limitation: cellular, satellite, Wi-Fi, Bluetooth, ultra-wideband (UWB) or other communications recognizable to those having ordinary skill in the art. UWB is a radio-based communication technology for short-range use and fast and stable transmission of data.

A centralized location 14 is shown highly schematically, but may be representative of many different structures, clouds, servers, or elements, as will be recognized by skilled artisans. The centralized location 14 represents systems that communicate with some or all of the other systems and/or objects described herein. The centralized location 14 includes numerous controllers. Additionally, the centralized location 14 may be a back office (BO) of the manufacturer of the vehicles.

Several transfer protocols or transfers 16 are schematically illustrated. These transfers 16 may include, without limitation: cellular, Wi-Fi, wired networks, over-the-air (OTA), other transport protocols, including machine to machine (M2M), or other telematics equipment, or other systems recognizable by those having ordinary skill in the art. M2M systems use point-to-point communications between machines, sensors, and hardware over cellular, Wi-Fi, or wired networks.

The drawings and figures presented herein are diagrams, are not to scale, and are provided purely for descriptive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The term vehicle is broadly applied to any moving platform. Vehicles into which the disclosure may be incorporated include, for example and without limitation: passenger or freight vehicles; autonomous driving vehicles; industrial, construction, and mining equipment; and various types of aircraft.

All numerical values of parameters (e.g., of quantities or conditions) in this specification, including the appended claims, are to be understood as being modified in all instances by the term "about," whether or not the term actually appears before the numerical value. About indicates that the stated numerical value allows some slight imprecision (with some approach to exactness in the value; about or reasonably close to the value; nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used herein, the term "substantially" often refers to relationships that are ideally perfect or complete, but where manufacturing realities prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

A generalized control system, computing system, or controller is operatively in communication with relevant components of all systems, and recognizable by those having ordinary skill in the art. The controller includes, for example and without limitation, a non-generalized, electronic control device having a preprogrammed digital computer or processor, a memory, storage, or non-transitory computer-readable storage medium used to store data such as control logic, instructions, lookup tables, etc., and a plurality of input/output peripherals, ports, or communication protocols.

Furthermore, the controller may include, or be in communication with, a plurality of sensors. The controller is configured to execute or implement all control logic or instructions described herein and may be communicating with any sensors described herein or recognizable by skilled artisans. Any of the methods described herein may be executed by one or more controllers.

The connectivity system 10 may be used to execute methods of determining whether a vehicle tracking device 20 is being used to track humans. The vehicle tracking device 20 is intendent to track assets, however, a problem that can arise is the misuse of this technology and these tracking devices being used to track unsuspecting people instead of the intended asset. The vehicle tracking device 20 may be from a first vehicle 22 and/or a second vehicle 24. Potential humans are represented by a first user 30 and a second user 32.

When it is determined that the vehicle tracking device 20 is being used to track humans, there may be a notification sent. Notification may include, without limitation, sending a text message to a smart device 34; alerting an app on the smart device 34; notifying the vehicle tracking device 20; setting off an audio alert on the vehicle tracking device 20; or notifying one or more authorities, such as police.

Smart devices 34 include, without limitation, web and/or cellular enabled smart phones or tablets, or others recognizable to skilled artisans. Smart device apps include numerous applications that run on smart devices 34, as will be recognized by skilled artisans.

Figure 2A:
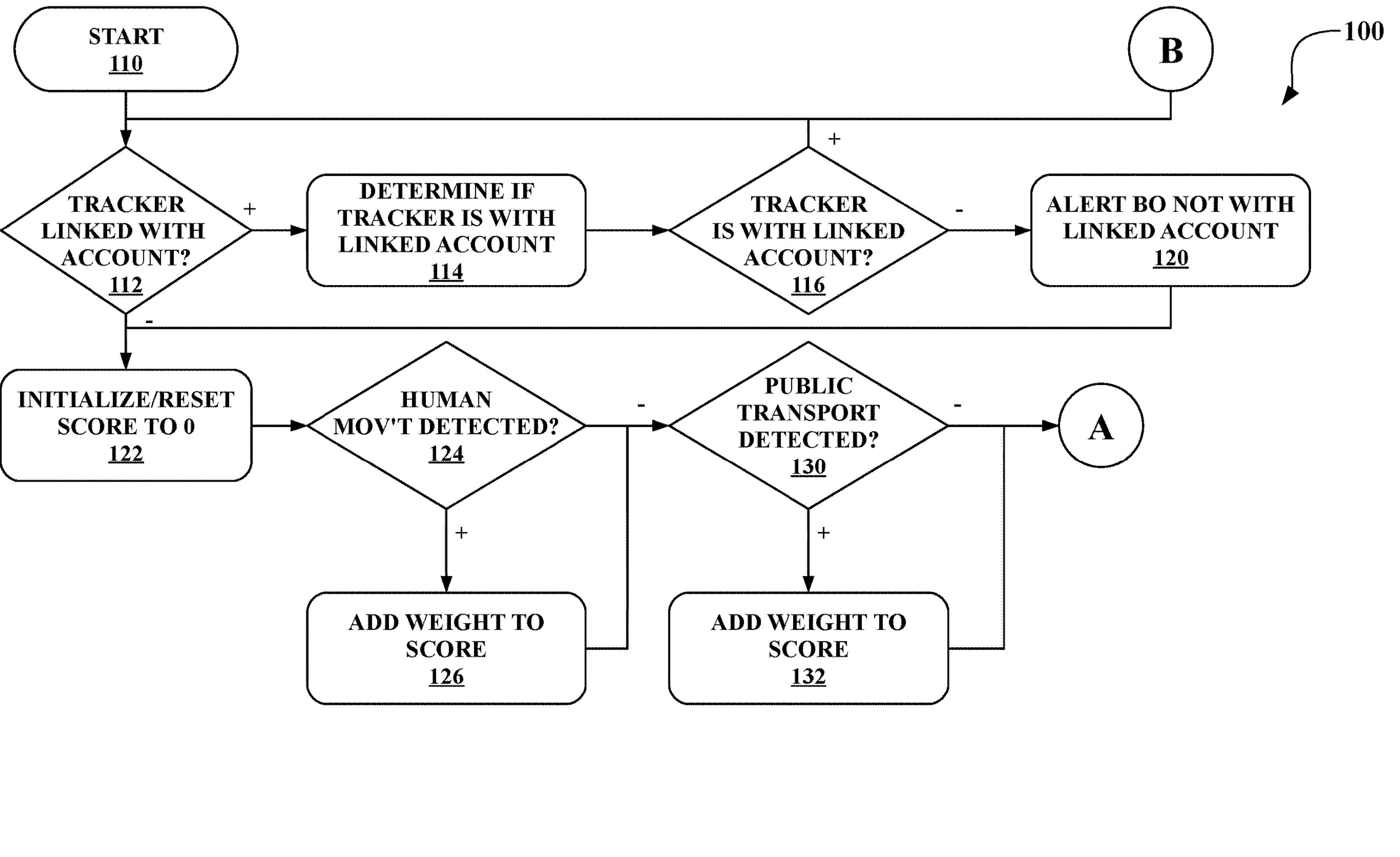
FIG. 2A and FIG. 2B are schematic flow chart diagrams of a method, or methods, for detecting the possibility a tracker is being used to track humans.
Figure 2B:
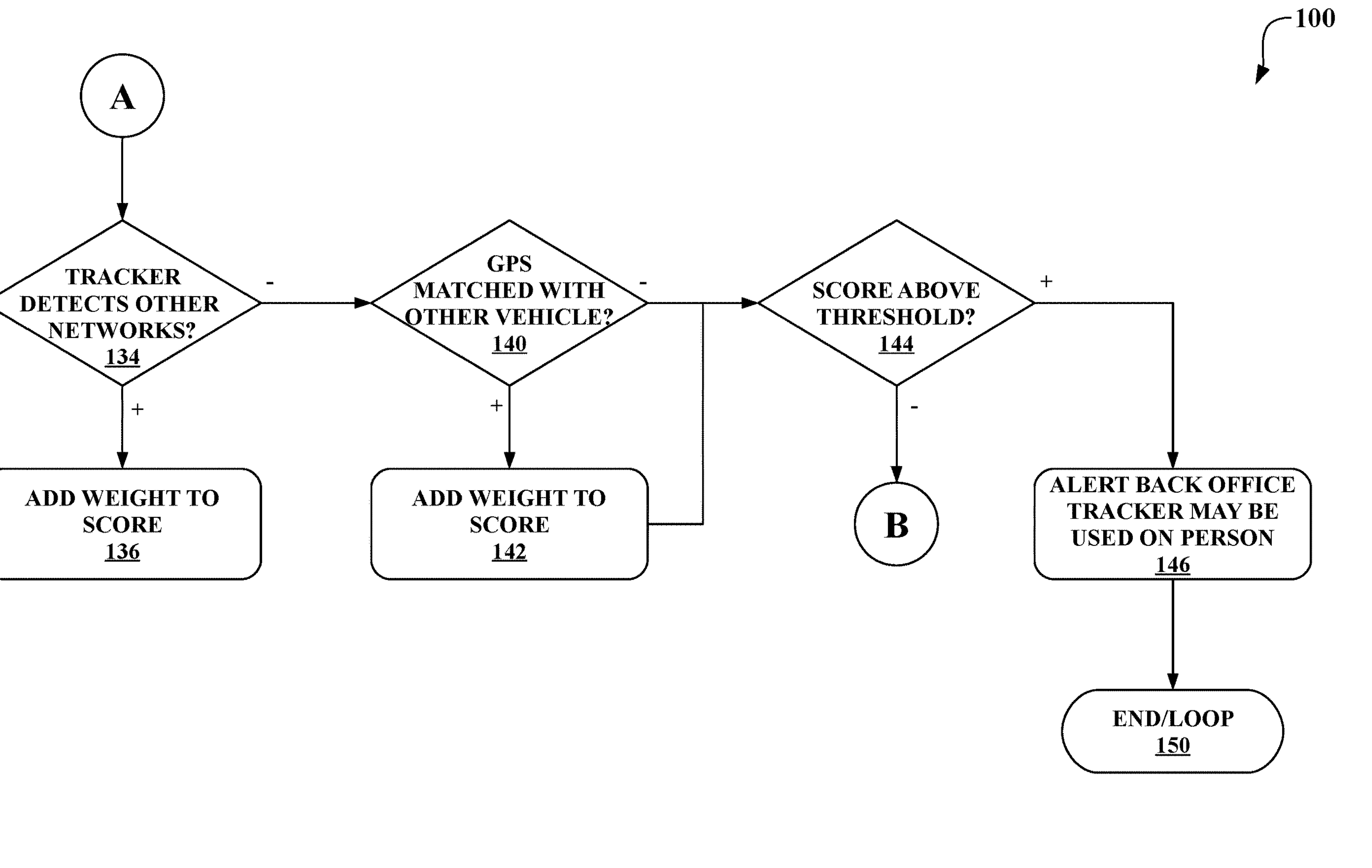

FIG. 2A and FIG. 2B are schematic flow chart diagrams of a method 100 for methods for determining whether the vehicle tracking device 20 is being used to track one or more humans. Note that method 100 may move back and forth between FIGS. 2A and 2B.

One or more of the methods described herein may be executed by the controller, including the non-transitory computer-readable storage medium, or other structures or equipment recognizable to skilled artisans. All steps described herein may be optional, in addition to those explicitly stated as such, and all steps described may be reordered or removed. Any of the methods described herein may store the data in the centralized location 14.

Step 110: START. At step 110 the method 100 initializes or starts. Method 100 may begin operation when called upon by one or more controllers, may be constantly running, or may be looping iteratively.

Step 112: TRACKER LINKED WITH ACCOUNT? At step 112, method 100 determines whether the vehicle tracking device 20 is linked with an account. For example, and without limitation, the vehicle tracking device 20 may be linked with an OnStar account, or similar systems from other manufacturers.

Step 114: DETERMINE IF TRACKER IS WITH LINKED ACCOUNT. At step 114, method 100 determines whether the vehicle tracking device 20 is with the assigned vehicle, which may be the first vehicle 22 or the second vehicle 24, or other vehicles not shown.

Step 116: TRACKER IS WITH LINKED ACCOUNT? At step 116, method 100 determines whether the vehicle tracking device 20 is with the linked account vehicle.

Step 120: ALERT BACK OFFICE NOT WITH LINKED ACCOUNT. At step 120, method 100 alerts the back office (BO), which may be part of the central location 14, that the vehicle tracking device 20 is not with its linked account vehicle. The back office knows whether the vehicle tracking device 20 is with its linked account vehicle by comparing the tracking information (may be GPS or other tracking information) of the vehicle tracking device 20 with the GPS tracking of its linked vehicle from the account.

Step 122: INITIALIZE/RESET SCORE TO ZERO. At step 122, method 100 either initializes a score at zero or resets the score to zero.

Step 124: HUMAN MOVEMENT DETECTED? At step 124, method 100 determines whether human movement has been detected. This may be detected by, without limitation: detecting steep elevation changes, including elevators, stairs, and the like; detecting acceleration data consistent with human movement; or detecting movement that is not on any road according to map data. Skilled artisans will recognize additional mechanisms for detecting human movement. Acceleration data consistent with human movement may include, without limitation, small accelerations typical of walking, consistently slow movements, or those typical of using stairs.

Step 126: ADD WEIGHT TO SCORE. At step 126, if method 100 determines that human movement has been detected, method 100 adds weight to the score for the human movement.

Step 130: PUBLIC TRANSPORT IS DETECTED? At step 130, method 100 determines whether public transport has been detected. This may be detected by, without limitation: detecting Global Positioning System (GPS) movement matching bus routes or stops; detecting multiple connected devices, such as cellphones, wearables, hotspots, public transport Wi-Fi, and the like; or detecting GPS movement matching known rideshare GPS movement—and the vehicle tracking device 20 is not registered to that rideshare. Skilled artisans will recognize additional mechanisms for detecting public transport.

Step 132: ADD WEIGHT TO SCORE. At step 132, if method 100 determines that public transit has been detected, method 100 adds weight to the score for the public transit detection.

Step 134: TRACKER DETECTS OTHER NETWORKS? At step 134, method 100 determines whether the vehicle tracking device 20 has detected other networks. This may be detected by, without limitation: detecting a different vehicle's hotspot or detecting the building's Wi-Fi. Skilled artisans will recognize additional mechanisms for detecting other networks.

Step 136: ADD WEIGHT TO SCORE. At step 136, if method 100 determines that other networks have been detected, method 100 adds weight to the score for the other network detection.

Step 134: TRACKER DETECTS OTHER NETWORKS? At step 134, method 100 determines whether the vehicle tracking device 20 has detected other networks. This may be detected by, without limitation: detecting a different vehicle's hotspot or detecting a building's Wi-Fi. Skilled artisans will recognize additional mechanisms for detecting other networks.

Step 136: ADD WEIGHT TO SCORE. At step 136, if method 100 determines that other networks have been detected, method 100 adds weight to the score for the other network detection.

Step 140: GPS MATCHED WITH OTHER VEHICLE? At step 140, method 100 determines whether the vehicle tracking device 20 matches the GPS of another vehicle. The back office generally knows what other vehicles' GPS coordinates/routes are and may link the two elements. Skilled artisans will recognize additional mechanisms for detecting other the locations of other vehicles.

Step 142: ADD WEIGHT TO SCORE. At step 142, if method 100 determines that the vehicle tracking device 20 matches the GPS of another vehicle, method 100 adds weight to the score for the other vehicle.

The weighted scores may be configurable. For example, and without limitation: if the location path matches a bus route, add +1 to the score; if vehicle tracking device 20 is going vertically (climbing stairs or on an elevator), add +3; if the vehicle tracking device 20 is off a mapped road, add +2; or if vehicle tracking device 20 detects other networks not associated with the linked vehicle, add +1. Note that these are only examples, and skilled artisans will recognize other weights to assign. The weights for different types of events may be adjusted as the methods learn more about the likelihood that the tracker is tracking a human.

Step 144: SCORE ABOVE THRESHOLD? At step 144, method 100 determines whether the combined weighted scores of all elements are above a threshold level. Skilled artisans will recognize how to determine threshold scores based on the various weighting of the different elements. The threshold score may be, for example and without limitation, +5 or greater. If the score is not above the threshold, method 100 goes back to step 112 to determine whether the tracker is linked with an account or may go to the end/loop step 150.

Step 146: ALERT BACK OFFICE THAT TRACKER MAY BE USED ON PERSON. At step 146, if method 100 determines that the scores exceed the threshold, the method alerts the back office the vehicle tracking device 20 may be being used to track an unsuspecting person.

Note that the back office may execute several alert types, including, without limitation: notifying the tracking device owner; setting off an audio alert on the tracking device; or notifying one or more authorities, including police. Additionally, the alerts and/or actions may be automated when the system determines that the tracker is tracking unsuspecting humans.

Step 150: END/LOOP. At step 140, the method 100 ends or loops. Ending/looping may include proceeding back to start step 110 or waiting until called upon to run again. Results of method 100 may be shared with first responders, such as, without limitation, including police, fire, or cities, to promote public responses and/or data collection. Implementing these methods will protect people in the community, ensure that manufacturer technology is not used for malicious purposes, and notify customers of a lost and/or stolen tracking device.

The detailed description and the drawings or figures are supportive and descriptive of the subject matter herein. While some of the best modes and other embodiments have been described in detail, various alternative designs, embodiments, and configurations exist.

Furthermore, any examples shown in the drawings or the characteristics of various examples mentioned in the present description are not necessarily to be understood as examples independent of each other. Rather, it is possible that each of the characteristics described in one of the examples of an embodiment can be combined with one or a plurality of other desired characteristics from other examples, resulting in other examples not described in words or by reference to the drawings. Accordingly, such other examples fall within the framework of the scope of the appended claims.

The invention claimed is:

1. A method of detecting that a vehicle tracking device is being used to track humans with a computer, comprising:
- determining whether the vehicle tracking device has been removed from its linked vehicle, wherein determining whether the vehicle tracking device has been removed from its linked vehicle includes comparing tracking information of the vehicle tracking device with GPS tracking of the linked vehicle;
- determining whether the vehicle tracking device is being used to track a human by tracking human movement; and
- alerting when it is determined that the vehicle tracking device is tracking one or more humans.

2. The method of claim 1, further comprising:
- determining whether a weighted score is greater than a threshold level.

3. The method of claim 2, wherein alerting includes at least one of:
- notifying an owner of the vehicle tracking device;
- setting off an audio alert on the vehicle tracking device; or
- notifying one or more authorities.

4. The method of claim 3, wherein determining whether the vehicle tracking device is being used to track a human by tracking human movement includes at least one of:
- detecting steep elevation changes;
- detecting acceleration data consistent with human movement; or
- detecting movement that is not on any road according to map data.

5. The method of claim 4, further comprising:
- determining whether the vehicle tracking device is with a different vehicle or in a building, by:
  - detecting a different vehicle's hotspot;
  - detecting a building's Wi-Fi; or
  - detecting GPS movement that matches a different vehicle's GPS movement.

6. The method of claim 5, wherein the vehicle tracking device includes battery power and wireless communications.

7. The method of claim 6, further comprising:
- determining that the vehicle tracking device is on public transport by, at least one of:
  - detecting GPS movement matching bus routes or stops;
  - detecting multiple connected devices; or detecting GPS movement matching known rideshare GPS movement.

8. The method of claim 3, wherein the alerts are automatically sent from a centralized location.

9. The method of claim 8, further comprising:

determining whether the vehicle tracking device is with a different vehicle or in a building, by:

detecting a different vehicle's hotspot;

detecting a building's Wi-Fi; or detecting GPS movement that matches a different vehicle's GPS movement, and wherein the vehicle tracking device includes battery power and wireless communications.

10. The method of claim 9, further comprising:

determining that the vehicle tracking device is on public transport by, at least one of:

detecting GPS movement matching bus routes or stops;

detecting multiple connected devices; or detecting GPS movement matching known rideshare GPS movement.

11. A method of detecting that a vehicle tracking device is being used to track humans with a controller, comprising:

determining whether the vehicle tracking device has been removed from its linked vehicle, wherein determining whether the vehicle tracking device has been removed from its linked vehicle includes comparing tracking information of the vehicle tracking device with GPS tracking of the linked vehicle;

determining whether the vehicle tracking device is being used to track a human by tracking human movement; and alerting when it is determined that the vehicle tracking device is tracking one or more humans, wherein alerts are automatically sent from a centralized location and the alerts include at least one of:

notifying an owner of the vehicle tracking device;

setting off an audio alert on the vehicle tracking device; or notifying one or more authorities.

12. The method of claim 11, further comprising:

determining whether the vehicle tracking device is with a different vehicle or in a building, by:

detecting a different vehicle's hotspot;

detecting a building's Wi-Fi; or detecting GPS movement that matches a different vehicle's GPS movement, and wherein the vehicle tracking device includes battery power and wireless communications.

13. The method of claim 12, wherein determining whether the vehicle tracking device is being used to track a human by tracking human movement includes at least one of:

detecting steep elevation changes;

detecting acceleration data consistent with human movement; or detecting movement that is not on any road according to map data.

14. The method of claim 13, further comprising:

determining that the vehicle tracking device is on public transport by, at least one of:

detecting GPS movement matching bus routes or stops;

detecting multiple connected devices; or detecting GPS movement matching known rideshare GPS movement.

15. A non-transitory computer-readable storage medium on which is recorded instructions, wherein execution of the instructions by a processor causes the processor to:

determine whether a vehicle tracking device has been removed from its linked vehicle, wherein determining whether the vehicle tracking device has been removed from its linked vehicle includes comparing tracking information of the vehicle tracking device with GPS tracking of the linked vehicle;

determine whether the vehicle tracking device is being used to track a human by tracking human movement; and alert when it is determined that the vehicle tracking device is tracking one or more humans, wherein the alert includes at least one of:

notify an owner of the vehicle tracking device;

set off an audio alert on the vehicle tracking device; or notify one or more authorities.

16. The non-transitory computer-readable storage medium on which is recorded instructions of claim 15, wherein execution of the instructions by the processor causes the processor to:

determine whether the vehicle tracking device is with a different vehicle or in a building, by at least one of:

detect a different vehicle's hotspot;

detect a building's Wi-Fi; or detect GPS movement that matches a different vehicle's GPS movement, and wherein arming the vehicle includes locking doors of the vehicle.

17. The non-transitory computer-readable storage medium on which is recorded instructions of claim 16, wherein execution of the instructions by the processor causes the processor to:

wherein the vehicle tracking device includes battery power and wireless communications; and determine that the vehicle tracking device is on public transport by, at least one of:

detect GPS movement matching bus routes or stops;

detect multiple connected devices; or detect GPS movement matching known rideshare GPS movement.

18. The non-transitory computer-readable storage medium on which is recorded instructions of claim 17, wherein execution of the instructions by the processor causes the processor to:

wherein determining whether the vehicle tracking device is being used to track a human by tracking human movement includes at least one of:

detecting steep elevation changes;

detecting acceleration data consistent with human movement; or detecting movement that is not on any road according to map data.

19. The non-transitory computer-readable storage medium on which is recorded instructions of claim 18, wherein execution of the instructions by the processor causes the processor to:

wherein the alerts are automatically sent from a centralized location.

20. The non-transitory computer-readable storage medium on which is recorded instructions of claim 19, wherein execution of the instructions by the processor causes the processor to:

determine whether a weighted score is greater than a threshold level.

* * * * *